(12) United States Patent
Ferrero et al.

(10) Patent No.: US 7,011,696 B2
(45) Date of Patent: Mar. 14, 2006

(54) ELIMINATION PROCESS OF FLUORINATED ANIONIC SURFACTANTS

(75) Inventors: Stefano Ferrero, Alessandria (IT); Evasio Deregibus, Alessandria (IT)

(73) Assignee: Solvay Solexis SpA, Milan (IT)

( * ) Notice: Subject to any disclaimer, the term of this patent is extended or adjusted under 35 U.S.C. 154(b) by 100 days.

(21) Appl. No.: 10/620,418

(22) Filed: Jul. 17, 2003

(65) Prior Publication Data
US 2004/0016343 A1 Jan. 29, 2004

(30) Foreign Application Priority Data
Jul. 18, 2002 (IT) .......................... MI2002A1581

(51) Int. Cl.
*B01D 53/14* (2006.01)
(52) U.S. Cl. .......................... 95/187; 95/233; 562/605
(58) Field of Classification Search .................. 95/187, 95/188, 206, 210, 233; 423/240 R; 562/605
See application file for complete search history.

(56) References Cited

U.S. PATENT DOCUMENTS

| | | | | |
|---|---|---|---|---|
| 3,882,153 A | * | 5/1975 | Seki et al. ................... | 554/184 |
| 3,907,522 A | * | 9/1975 | Tsukamoto et al. ........... | 95/210 |
| 4,282,162 A | | 8/1981 | Kuhls | |
| 4,411,787 A | | 10/1983 | Riley | |
| 4,623,487 A | * | 11/1986 | Cope .......................... | 554/185 |
| 5,591,877 A | * | 1/1997 | Obermeier et al. ......... | 554/226 |
| 5,990,330 A | | 11/1999 | Sulzbach et al. | |
| 6,245,923 B1 | | 6/2001 | Sulzbach et al. | |
| 2002/0151748 A1 | * | 10/2002 | Jones et al. ................. | 562/605 |

FOREIGN PATENT DOCUMENTS

| | | |
|---|---|---|
| DE | 3902843 A1 | 8/1990 |
| EP | 0 413 858 A1 | 8/1989 |

OTHER PUBLICATIONS

Perry and D. Green, "Liquid-Solid Operations and Equipment", Perry Chemical Engineer's Handbook, Sixth Ed., pp. 18-1-18-42.
Perry and D. Green, "Gas-Solid Operations and Equipment", Perry Chemical Engineer's Handbook, Sixth Ed., pp. 17-22-17-27.
Metrohm Application Bulletin, "For the Determination of Anions With and Without Chemical Suppression", Metrosep Anion Dual 2 IC Column (6.1006.100), No. 261/1 e, pp. 1-9.
Metrohm Application Bulletin, "Titrimetric/Potentiometric Determination of Anionic and Cationic Surfactants With the High Sense Electrode"), No. 233/2 e, pp. 1-15.
UNICHIM—Manuale 124 Ed. 1995 N. 771.
R. Schulz, Metrohm Monograph, "Titrimetric Determination of Surfactants and Pharmaceuticals Modern Methods for Analytical Practice", pp. 52-82.
International Publication No. WO 02/062742 A1, published Aug. 15, 2002.

* cited by examiner

*Primary Examiner*—Frank M. Lawrence
(74) *Attorney, Agent, or Firm*—Arent Fox PLLC

(57) ABSTRACT

An elimination process of fluorinated anionic sufactants from exhausted gaseous streams, wherein the gaseous stream is put into contact with aqueous solutions having in the range from 3.5 to 13.8, the aqueous solution density being lower than 1.05 g/cm$^3$, wherein the concentration in the aqueous solution of the fluorinated anionic surfactant removed by the gaseous stream is lower than or equal to 70 ppm.

20 Claims, 1 Drawing Sheet

ELIMINATION PROCESS OF FLUORINATED ANIONIC SURFACTANTS

The present invention relates to a process to remove or to eliminate fluorinated anionic surfactants from gaseous streams.

More specifically the invention relates to a process to remove anionic fluorinated surfactants of perfluorinated carboxylic acids or their derivatives or their salts, from exhausted air streams coming from drying fluoropolymer processes.

It is well known that anionic fluorinated surfactants, in particular the perfluorinated carboxylic acids or their derivatives, preferably having a number of carbon atoms from 7 to 10, are used in the polymerization in aqueous dispersion of fluorinated monomers, for example TFE.

In said processes a sufficiently high amount of fluorinated anionic surfactant must be used, so as to be able to stabilize the polymer colloidal particles to avoid coagulation phenomena. The most industrially used fluorinated anionic surfactant is the acid having 8 carbon atoms (perfluorooctanoate) or its salts, for example of ammonium or sodium.

When the latex obtained from the polymerization is coagulated by addition of electrolytes, substantially all the perfluorinated surfactant remains adsorbed on the surface of the solid polymer particles. The surfactant present on the polymer surface, together with the residual water, is then removed during the drying step, carried out at temperatures in the range 120° C.–280° C. The surfactant passes to the gaseous state and mixes itself with the inert gas mixture, typically air, flowing out from the equipment used for the drying.

The anionic perfluorinated surfactants, in particular the perfluorooctanoate in acid form or under salt form, are very effective products for the use in the fluorinated monomer polymerization, but they cannot be discharged in the environment since biopersistent. For this reason the international authorities, for example EPA, require a greater and greater reduction of perfluorinated surfactant emissions.

Processes to reduce the PFOA amount in the gaseous streams coming from the drying plants of fluorinated polymers are known in the prior art.

U.S. Pat. No. 5,990,330 describes a recovery process from exhausted gaseous streams, containing anionic fluorinated surfactants deriving from perfluorinated carboxylic acids or salts thereof. The process consists in contacting, in an absorption column, the gaseous stream with a concentrated alkaline solution, for example sodium hydroxide, under conditions such to have phase separation. By using said concentrated alkaline solutions it is avoided foam formation in the column, which would decrease the process efficiency. To obtain a substantially complete phase separation the alkaline solution density must be >1.15 g/cm$^3$. The separated phase concentrated in PFOA is removed in a decanter and subsequently purified to recover and reuse the surfactant. Indeed it is well known that PFOA, to be used in polymerization must be very pure. The drawback of the use of a concentrated alkaline solution to remove PFOA from gaseous streams is that the dirtying and successively the formation of encrustations in the equipment wherein the perfluorooctanoate elimination is carried out takes place. Therefore plant stops are necessary for the equipment cleaning.

In U.S. Pat. No. 6,245,923 a process is described operating in the plant described in U.S. Pat. No. 5,990,330, wherein in the absorption column, as concentrated alkaline solution for the PFOA removal, a concentrated potassium carbonate solution is used. In comparison with previous patent, with this process the dirtying problems are reduced. However, also in this case plant stops, even though less frequent, are necessary for the equipment cleaning.

The need was felt to have available a process to remove fluorinated anionic surfactants from gaseous streams with high efficiency, higher than 99.0%, preferably higher than or equal to 99.9%, without having dirtying/encrustations problems and without the formation in the plant of foam amounts such to influence the process efficiency. In fact if foams reach an height equal to about 50% of the absorption column height, PFOA dragging phenomena with air in the environment take place.

The Applicant has surprisingly and unexpectedly found that it is possible to solve said technical problem by the process described hereinafter.

SUMMARY OF THE INVENTION

An object of the present invention is an elimination process of fluorinated anionic sufactants from exhausted gaseous streams, having efficiency higher than 99.0%, preferably higher than or equal to 99.9%, wherein the gaseous stream is put into contact, for example by a scrubber, with aqueous solutions having pH from 3.5 to 13.8, the aqueous phase density being lower than 1.05 g/cm$^2$, preferably lower than 1.03 g/cm$^3$, wherein the concentration in the aqueous solution of the fluorinated anionic surfactant removed from the gaseous stream is lower than or equal to 70 ppm, preferably lower than or equal to 60 ppm, still more preferably lower than 50 ppm.

The fluorinated anionic surfactants are determined in the aqueous solution by potentiometric titration.

Preferably the anionic fluorinated surfactants are selected from perfluorinated carboxylic acid or derivatives thereof, in particular perfluorooctanoate in its acid or salified form.

The used absorption column can be a filling up column, preferably structured, a plate column or a spray column; preferably a spray column is used.

Said columns are widely described in the prior art, see for example "Perry Chemical Engineers' Handbook" Sixth Ed. R. H. Perry and D. Green, pages 18.1–18.42.

With the invention process there is no encrustation formation in the surfactant removal column and surfactant losses do not occur, for example due to the formation of low boiling azeotropes surfactant-water. Besides, the foam formation is very reduced and can also be absent.

With the invention process, unexpectedly and surprisingly, the removal of the fluorinated surfactant from the gaseous stream is obtained without the formation of two separate liquid phases, as it takes place in the processes of the prior art.

Furthermore with the invention process, using as said also diluted alkaline solutions, there are no corrosion phenomena in the scrubber and therefore also conventional materials can be used to prepare the absorption column. This is a further advantage of the invention process, which results less complicated and expensive from the industrial point of view compared with the processes of the prior art.

The solution flowing out from the absorption column, containing the removed fluorinated anionic surfactant, can be recycled (recycle solution) to the absorption column to limit the volumes of the aqueous solution used in this phase.

The process of the present invention can be carrid out in a continuous or a discontinuous way, preferably it is carried out in a continuous way.

The continuous process is carried out for example by recyclcing the solution and recovering the surfactant at each recycle, or by recycling the solution until reaching a concentration of 70 ppm and then by treating the liquid phase to remove the surfactant, or by using in the gas absorption phase fresh solution without recycle; or for example by feeding a fresh aqueous solution aliquot and drawing from the plant an aliquot containing the anionic surfactants to be sent to a recovery plant.

The discontinuous process is carried out for example by recycling the solution used in the absorption column without recovering the surfactant until a concentration of 70 ppm is reached.

Among the methods used to recover the surfactant from the aqueous solution flowing out from the absorption column, it can be mentioned the passing on anionic exchange resins, or on specific adsorbers for fluorinated surfactants, or by operating with reverse osmosis units, or by precipitation with polivalent cation salts, for example $Al_2(SO_4)_3$.

Said same methods are used to bring the anionic surfactant concentration in the recycle solution to levels lower than 70 ppm. Generally the above mentioned method using $Al_2(SO_4)_3$ is not used to remove the surfactant from the recycle solutions.

Preferably the treatment is carried out with strong or weak anionic exchange resins, preferably with strong anionic exchange resins.

With strong exchange anionic resins are meant resins wherein the active resin sites are quaternay ammonium groups; with weak exchange anionic resins are meant resins wherein the active resin sites are aminic groups protonizable with secondary or primary ammonium.

Among strong anionic exchange resins there can be mentioned Amberlite®IRA 402, Amberjet®4400 OH, Amberlist®A26 OH e Dowex®MSA C. Among weak anionic exchange resins, Amberlist®A23, Amberlist®A21 can be mentioned.

The recovery of the fluorinated anionic surfactant from the ionic exchange columns can be carried out for example with a mixture of diluted mineral acids and polar organic solvents, miscible with water for at least 40% by volume. See for example U.S. Pat. No. 4,282,162, herein incorporated by reference.

Among fluorinated surfactant adsorbers, active carbon, such for example Norit®PK1-3, Norit® GAC830, or aluminas and silicas containing free hydroxyl can be mentioned.

The reverse osmosis plant are well known in the prior art, see for example "Perry Chemical Engineers' Handbook" Sixth Ed., R. H. Perry and D. Green, pages 17.22–17.27. For specific applications to concentrate aqueous solutions see for example patents U.S. Pat. No. 4,411,787 and EP 413,858.

The initial removal solution, and/or the recycle solution have generally a temperature in the range 5° C.–40° C. preferably 10° C.–30° C.

BRIEF DESCRIPTION OF THE DRAWINGS

For illustrative but not limitative purposes, the present invention process is reported in detail in FIG. 1.

DESCRIPTION OF THE PLANT 1 the feeding ventilator of the gaseous stream to the drying oven;
2 the powder drying oven;
3 the feeding pipe of the gaseous stream to the absorption column 4;
5 the tank of collection and homogeneization of the liquid flowing out from the absorption column;
6 the pump which conveys the output liquid from the collection tank to the heat exchanger 7;
8 the heat exchange unit which maintains the temperature required in the heat exchanger 7;
9 and 10, respectively, each of the two valves which give access to the anionic exchange columns 11 and 12;
14 and 13 show, respectively, each of the two valves which close downstream the anionic exchange columns;
15 is the valve by which the solution flowing out from from the exchanger 7 is directly recycled to the absorption column 4;
16 is the piping to which the valves 13, 14, 15 are connected and it recycles the solution into the absorption column 4;
17 is the piping which collects the exhausted gaseous stream leaving the absorption column 4, and which is discharged in the atmosphere.

Figure 1:
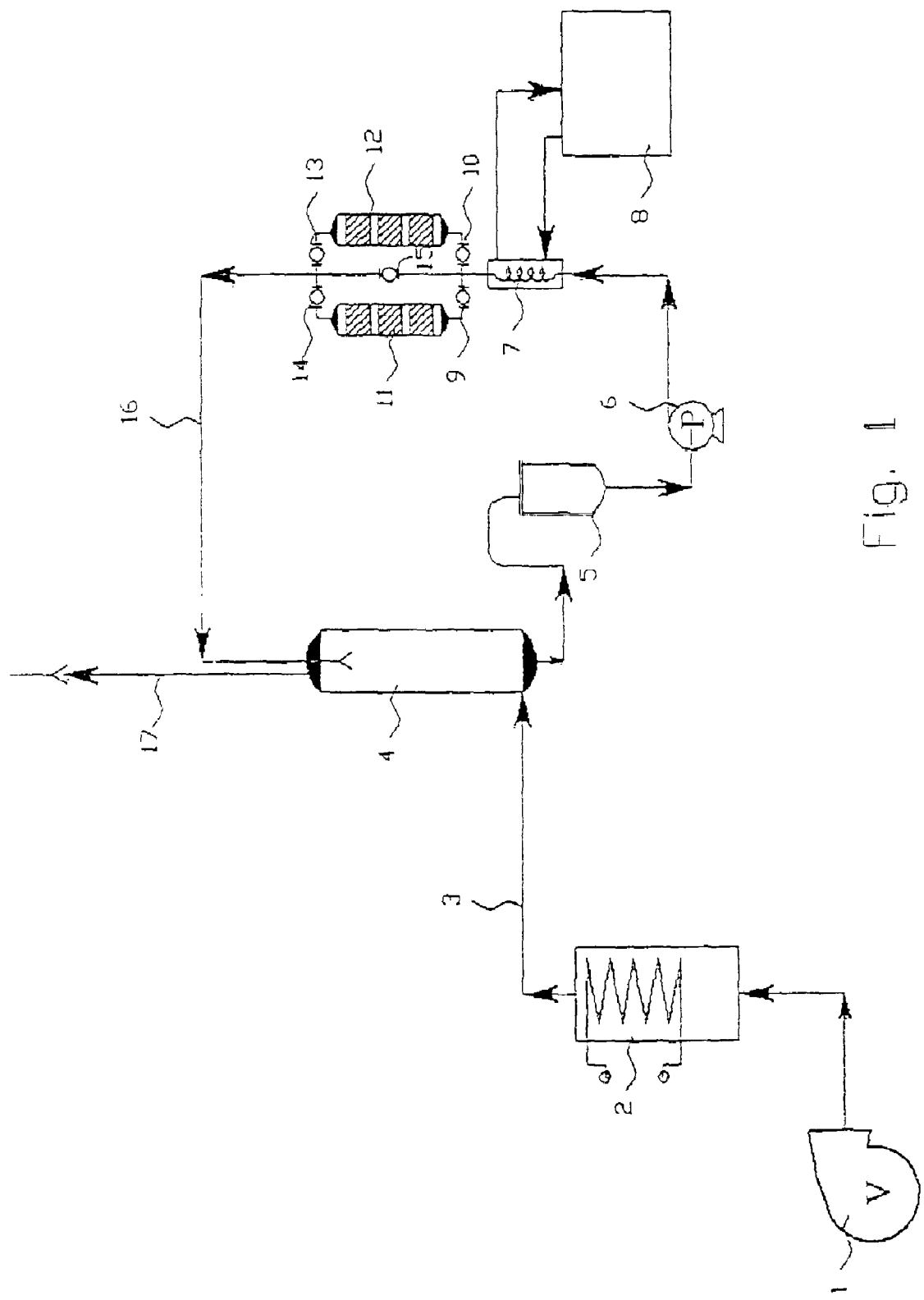

Columns 11 and 12 work so that when one of them is used for the anionic exchange, the other is regenerated whereby, for example, during a cycle the valves 9 and 14 will be closed and the valves 10 and 13 opened, and viceversa in the subsequent cycle.

On the liquid which is recycled through the piping 16 to the absorption column, the pH is measured which must be maintained in the 3.5–13.5 limits, if needed, optionally by adding acid or alkaline solutions, depending on the used ionic exchange resin column.

The present invention process, with reference to the scheme of FIG. 1, operates as follows.

The gaseous flow pushed by the ventilator 1 through the drying oven 2, removes both the water and the anionic surfactant from the coagulated powder during the drying. The exhausted gaseous flow 3, containing from example from 35 mg/kg to >200 mg/kg of PFOA, and having a temperature in the range 120° C.–280° C., enters the absorption column or scrubber 4. In the absorption column the liquid stream fed by piping 16 is in countercurrent with respect to the imput gas flow. The contact among the phases can be obtained by structured filling up, plate column, or distributing the liquid stream inside the column in the form of small drops by atomizing nozzles.

The outflowing gaseous stream 17, after separation of the small dragged liquid drops, is discharged in the environment.

In scrubber 4 the ratio by weight among the flow rates of the feeding aqueous solution (L) through pipe 16, and of gas (G) fed through pipe 3, can range from 2 to 20, preferably from 4 to 15.

The liquid stream flowing out from the scrubber 4 is discharged in the homogeneization tank 5. Generally the temperature of the liquid solution flowing out from the absorption column (scrubber 4) has a temperature from 15° C. to 43° C.

By pump 6 said liquid stream is transferred to the heat exchanger 7, which maintains constant the temperature of the liquid solution generally at a value from 5° C. to 40° C., preferably from 10° C. to 30° C. The solution is then fed to one of the ionic exchange resin columns 11 or 12. When column 11 is recovering the surfactant from the washing solution, column 12 is regenerated to recover the surfactant retained by the ion exchange resin, and viceversa. The column 11 or 12 which is used operates in the temperature range of the exchanger 7. After the passing in theic exchange column the solution is fed again to the absorption column 4.

The plant with the described process operates in a continuous way.

The apparatus of FIG. 1, as said, can operate also in a discontinuous way. In this case from pipe 16 a fresh aqueous solution is introduced into the scrubber 4 and the solution of tank 5 is recovered. Or the aqueous solution of tank 5 is recycled, optionally mixed with a fresh aqueous solution, avoiding the passing on the column 11 or 12, until the concentration of the fluorinated anionic surfactant flowing out from the scrubber 4 is of 70 ppm, preferably lower than or equal to 60 ppm, still more preferably lower than 50 ppm. When flowing out from the scrubber 4 the anionic surfactant concentration is higher than 70 ppm, in this case it is not recycled but it is treated with the above mentioned methods to bring again the concentration to values lower than 70 ppm. At this point this solution can be recycled by following the above mentioned steps.

The following Examples are given for illustrative and not limitative purposes of the present invention.

EXAMPLES

Analysis of Fluorinated Anionic Surfactants in Aqueous Solutions

The analysis has been carried out by the potentiometric titration method described in "Application Bullettin 261/1", "Application Bullettin 233/2" Metrohom and at pages 52–82 of "Titrimetric determination of surfactants and pharmaceuticals" by R. Schulz Metrohom monograph.

Analysis of PFOA in Gases

A fraction of the outflowing gas is let absorb as described in the publication UNICHIM—Manual 124 Ed. 1995 No. 771 "Determinazione del perfluoroottanoato di ammonio metodo colorimetrico". The method sensitivity limit is 0.0004 mg/Kg.

PFOA Recovery Process—General Part

In the Examples the recovered PFOA fraction is quantified by feeding in the plant described in FIG. 1 a gaseous stream having a known PFOA concentration.

The used absorption column 4 is of the spray scrubber type in countercurrent. The column has diameter of 100 mm and length of 1000 mm. The liquid distribution is made by an atomizing nozzle put on the scrubber head, capable to give drops having a diameter in the range 200–600 $\mu$m.

The removal liquid was formed by demineralized water, or a diluted NaOH solution (pH 10), having a flow rate of 90 kg/h and temperature from 25° C. to 30° C.

The liquid collected at the scrubber bottom in the Examples 1–5 has ben recycled in the absorption column top, without carrying out the passing on the ionic exchange resin column.

In the Examples 6 and 7 the liquid flowing out from the scrubber was let flow on an anionic exchange column having a diameter of 50 mm and height of 200 mm, filled with Dowex®MSA 1C resin.

The recovered PFOA percentage has been expressed as 100 X (PFOA amount present in solution)/PFOA amount fed in the gaseous stream.

Example 1A 4.5 kg/h of gas coming from a drying process at a temperature of 135° C. of a powder of a perfluorinated polymer coagulated from a latex, are fed from the above described absorption column bottom, scrubber type.

The ratio between the liquid/gas flow rate is 18.

The inlet gas has a constant PFOA concentration equal to 98 mg/kg.

During the process (118 minutes time) no phase separation phenomena in the obtained PFOA solution have been noticed.

The aqueous solution pH at the beginning of the test was 7.04 and at the end 3.87.

During the test the PFOA concentration in the gaseous phase has been continuously determined by means of the above described analysis method.

At the end the PFOA concentration both in the liquid and in the gas flowing out from the scrubber has been determined.

The PFOA concentration is expressed in ppm, i.e. mg of PFOA/kg of aqueous solution.

The ratio between the foam heigth and the scrubber diameter is shown in Table 1 as Hfoam/Dcolumn.

At the end of the test the PFOA concentration in the aqueous solution is 56 ppm, the recovery efficiency >99.9%.

The results are reported in Table 1.

Example 1B (Comparative)

The process described in the Example 1A was continued for a total time of 12 hours and 20 minutes.

No phase separation phenomena in the obtained PFOA solution have been noticed. The density of the aqueous solution resulted lower than 1.03 g/cm$^3$.

The solution pH at the end of the process was 3.24.

At the end of the test the PFOA concentration in the aqueous solution is 250 ppm, the recovery efficiency >95%.

The results are reported in Table 1.

Comment on the Examples 1A and 1B

Said Examples show that for a surfactant concentration in the fed gaseous stream of 98 mg/kg, at PFOA concentrations in water not higher than 56 ppm the recovery efficiency is very good and never lower than 99.9%. When the surfactant concentration increases to 250 ppm the process efficiency decreases to 95%.

Example 2A

The process described in the Example 1A is repeated but by using an inlet gas having a constant PFOA concentration equal to 178 mg/kg.

The ratio between the liquid/gas flow-rate is 18.

The process lasts 74 minutes in total.

No phase separation phenomena in the obtained PFOA solution have been noticed. The density of the aqueous solution resulted lower than 1.03 g/cm$^3$.

The initial solution pH was 7.08 and at the end of the process 3.80.

At the end of the test the PFOA concentration in the aqueous solution is 66 ppm, the recovery efficiency >99.9%.

The results are reported in Table 1.

Example 2B (Comparative)

The example 2A is continued, over the above mentioned time, for 5 hours and 45 minutes in total.

No phase separation phenomena in the obtained PFOA solution have been noticed. The density of the aqueous solution resulted lower than 1.05 g/cm$^3$.

The solution pH at the end of the process was 3.30.

At the end of the test the PFOA concentration in the aqueous solution is 220 ppm, the recovery efficiency >86.7%.

The results are reported in Table 1.

Comment on the Examples 2A and 2B

Said Examples show that for a surfactant concentration in the fed gaseous stream of 178 mg/kg, at PFOA concentrations in water not higher than 66 ppm the recovery efficiency is very good and never lower than 99.9%. When the surfactant concentration increases to 220 ppm the process efficiency decreases to 86.7%.

Example 3A

The process described in the Example 1A is repeated but by using an inlet gas having a constant PFOA concentration equal to 200 mg,/kg.

The ratio between the liquid/gas flow-rate is 18.

The process lasts 32 minutes in total.

No phase separation phenomena in the obtained PFOA solution have been noticed. The density of the aqueous solution resulted lower than 1.03 g/cm$^3$.

The solution pH at the end of the process was 4.12.

At the end of the test the PFOA concentration in the aqueous solution is 32 ppm, the recovery efficiency >99.9%.

The results are reported in Table 1.

Example 3B (Comparative)

The Example 3A is continued, over the above mentioned time, for 13 hours and 40 minutes in total.

No phase separation phenomena in the obtained PFOA solution have been noticed. The density of the aqueous solution resulted lower than 1.03 g/cm$^3$.

The solution pH at the end of the process was 2.95.

At the end of the test the PFOA concentration in the aqueous solution is 520 ppm, the recovery efficiency >90.0%.

The results are reported in Table 1.

Example 3C (Comparative)

The Example 3B is continued for a total time of 30 hours.

No phase separation phenomena in the obtained PFOA solution have been noticed. The density of the aqueous solution resulted lower than 1.03 g/cm$^3$.

The solution pH at the end of the process was 2.65.

At the end of the test the PFOA concentration in the aqueous solution is 1,125 ppm, the recovery efficiency >80.0%.

The results are reported in Table 1.

Comment on the Examples 3A, 3B and 3C

Said Examples show that for a surfactant concentration in the fed gaseous stream of 200 mg/kg, at PFOA concentrations in water not higher than 32 ppm the recovery efficiency is very good and never lower than 99.9%. When the surfactant concentration increases to 520 ppm (Example 3B) the process efficiency decreases to 90% and at 1,225 ppm the efficiency is 80% with formation of considerable foam amount.

Example 4A

The process described in the Example 1A is repeated but by using an inlet gas having a constant PFOA concentration equal to 100 mg/kg and an absorption liquid formed by a diluted solution of NaOH pH 10 (density <1.004 g/ml).

The ratio between the liquid/gas flow-rate is 18.

The process lasts 90 minutes in total.

No phase separation phenomena in the obtained PFOA solution have been noticed. The density of the aqueous solution resulted lower than 1.03 g/cm$^3$.

The initial solution pH was 10 and at the end of the process 6.91.

At the end of the test the PFOA concentration in the aqueous solution is 50 ppm, the recovery efficiency >99.9%.

The results are reported in Table 1.

Example 4B (Comparative)

The Example 4A is continued, over the above mentioned time, for 470 minutes in total.

No phase separation phenomena in the obtained PFOA solution have been noticed. The density of the aqueous solution resulted lower than 1.03 g/cm$^3$.

The solution pH at the end of the process was 6.34.

At the end of the test the PFOA concentration in the aqueous solution is 188 ppm, the recovery efficiency >93.5%.

The results are reported in Table 1.

Comment on the Examples 4A and 4B

Said Examples show that for a surfactant concentration in the fed gaseous stream of 100 mg/kg, at PFOA concentrations in water not higher than 50 ppm the recovery efficiency is very good and never lower than 99.9%. When the surfactant concentration increases to 188 ppm the process efficiency decreases to 93.5%.

Example 5A

The process of the Example 1A is repeated but by using an inlet gas flow-rate of 9 kg/h, having a constant PFOA concentration of 35 mg/kg.

The ratio between the liquid/gas flow-rate is 9.

The process lasted 110 minutes in total.

No phase separation phenomena in the obtained PFOA solution have been noticed. The density of the aqueous solution resulted lower than 1.03 g/cm$^3$.

The initial solution pH was 7.0 and at the end of the process 4.02.

At the end of the test the PFOA concentration in the aqueous solution is 39 ppm, the recovery efficiency >99.9%.

The results are reported in Table 1.

Example 5B (Comparative)

The Example 5A is continued, over the above mentioned time, for 11 hours and 30 minutes in total.

No phase separation phenomena in the obtained PFOA solution have been noticed. The density of the aqueous solution resulted lower than 1.03 g/cm$^3$.

The solution pH at the end of the process was 2.25.

At the end of the test the PFOA concentration in the aqueous solution is 170 ppm, the recovery efficiency >90.0%.

The results are reported in Table 1.

Comment on the Examples 5A and 5B

Said Examples show that for a surfactant concentration in the fed gaseous stream of 35 mg/kg, with a gas flow rate of 9 kg/hour at PFOA concentrations in water not higher than 39 ppm, the recovery efficiency is very good and never lower than 99.9%. When the surfactant concentration increases to 170 ppm the process efficiency decreases to 90.0%.

Example 6

The Example 1 is repeated but by using a gas having a PFOA concentration of 170 mg/kg. The liquid collected at the scrubber bottom, as said in the general part, in this case has been fed to the ionic exchange resin column Dowex®MSA 1C.

The ratio between the liquid/gas flow-rate is 18.

The process lasts 5 hours and 20 minutes in total.

No phase separation phenomena in the obtained PFOA solution have been noticed. The density of the aqueous solution resulted lower than 1.03 g/cm$^3$.

The initial solution pH was 7.05 and at the end of the process 12.

At the end of the test the PFOA concentration in the aqueous solution is 20 ppm, the recovery efficiency >99.9%.

The results are reported in Table 1.

Example 7

The Example 6 is repeated but by using a gas having a PFOA concentration of 210 mg/kg.

The process lasts 20 days.

No phase separation phenomena in the obtained PFOA solution have been noticed. The density of the aqueous solution resulted lower than 1.05 g/cm$^3$.

The initial solution pH was 7.02 and at the end of the process 13.5.

At the end of the process no encrustation phenomena in the heat exchanger 7 and of deposits in tank 5 are noticed.

At the end of the test the PFOA concentration in the aqueous solution is 20 ppm, the recovery efficiency >99.9%.

The results are reported in Table 1.

Comment on the Examples 6 and 7

Said Examples show that for a surfactant concentration in the fed gaseous stream of 170 mg/kg in the Example 6 and of 210 mg/kg in the Example 7, with a gas flow-rate of 9 kg/hour, at PFOA concentrations in water not higher than 20 ppm, by inserting in the process the passing of the recovery solution in an anionic exchange column, the recovery efficiency is very good and never lower than 99.9%. Besides, also in the case of plant prolonged operating as in the Example 7, encrustations or deposits, as said, do not form.

TABLE 1

| | | Ammonium perfluorooctanoate (PFOA) | | | | | | |
|---|---|---|---|---|---|---|---|---|
| Ex. | Duration min | Conc. in air stream mg/Kg | Conc. in the recovery solution mg/Kg | PFOA weight fed in the stream mg | PFOA weight in the recovery solution mg | Recovery % | Conc. in the outlet stream mg/Kg | Hfoam/Dcol. |
| 1A | 118 | 98 | 56 | 864 | 864 | >99.9 | — | 0.5 |
| 1Bcomp | 740 | 98 | 250 | 5420 | 5100 | 95 | 4.9 | 3.5 |
| 2A | 74 | 178 | 66 | 990 | 989 | 99.9 | — | 0.8 |
| 2Bcomp | 345 | 178 | 220 | 4580 | 3970 | 86.7 | 24 | 3.5 |
| 3A | 32 | 200 | 32 | 480 | 480 | >99.9 | — | 0.3 |
| 3Bcomp | 820 | 200 | 520 | 12260 | 11050 | 90.0 | 20 | 3.9 |
| 3ccomp | 1800 | 200 | 1125 | 27060 | 21650 | 80.0 | 40 | 8.9 |
| 4A | 90 | 100 | 50 | 680 | 680 | >99.9 | — | 0.5 |
| 4Bcomp | 470 | 100 | 188 | 3530 | 3290 | 93.5 | 1.5 | 2.3 |
| 5A | 110 | 35 | 39 | 585 | 585 | >99.9 | — | 0.3 |
| 5Bcomp | 690 | 35 | 170 | 3600 | 3245 | 90.0 | 3.5 | 2.0 |
| 6 | 320 | 170 | <20 | 4060 | — | >99.9 | 0 | 0 |
| 7 | 14400 | 210 | <20 | 226800 | — | >99.9 | 0 | 0 |

The invention claimed is:

1. An elimination process of fluorinated anionic surfactants from exhausted gaseous streams wherein the gaseous stream is put into contact with aqueous solutions having pH from 3.5 to 13.8, the aqueous solution density being lower than 1.05 g/cm$^3$, wherein the concentration in the aqueous solution of the fluorinated anionic surfactant removed from the gaseous stream is lower than or equal to 70 ppm.

2. The process according to claim 1, wherein the anionic fluorinated surfactants are selected from perfluorinated carboxylic acids or derivatives thereof.

3. The process according to claim 1, wherein the contact between the gaseous stream and the aqueous solution is carried out in a scrubber.

4. The process according to claim 3, wherein the scrubber is a filling up column.

5. The process according to claim 1, wherein the process operates in a discontinuous or a continuous way.

6. The process according to claim 3, wherein the process operates in the continuous way according to a method selected from the group consisting of:

recycling the solution and recovering the surfactant at each recycle;

recycling the solution until reaching a surfactant concentration of 70 ppm and then by treating a liquid phase to remove the surfactant;

using in the scrubber fresh solution without recycle; and feeding a fresh aqueous solution aliquot and drawing from the scrubber an aliquot containing the anionic surfactants to be recovered.

7. The process according to claim 3, wherein when the process operates in the discontinuous way, the solution used in the scrubber is recycled until a surfactant concentration of 70 ppm is reached.

8. The process according to claim 6, wherein the surfactant is recovered from the aqueous solution flowing out from the scrubber by a method selected from the group consisting of:

passing the solution on anionic exchange resins;
using specific adsorbers for fluorinated surfactants;
reverse osmosis units; and
precipitation with polyvalent cation salts.

9. The process according to claim 8, wherein a strong anionic exchange resin is used.

10. The process according to claim 8, wherein the used specific adsorbers are selected from the group consisting of active carbon, aluminas, and silicas.

11. The process according to claim 6, wherein the aqueous solution from which the surfactant is recovered, and/or the recycle solution have a temperature in the range 5° C.–40° C.

12. The process according to claim 3, wherein, in the scrubber, the ratio by weight among flow rates of the aqueous solution and gaseous stream is from 2 to 20.

13. The process of claim 1, wherein the aqueous solution density is lower than 1.03 g/cm$^3$.

14. The process of claim 1, wherein the concentration in the aqueous solution of the fluorinated anionic surfactant removed from the gaseous stream is lower than or equal to 60 ppm.

15. The process of claim 1, wherein the concentration in the aqueous solution of the fluorinated anionic surfactant removed from the gaseous stream is lower than 50 ppm.

16. The process of claim 2, wherein the anionic fluorinated surfactants are perfluorooctanoate in acid or salified form.

17. The process of claim 4, wherein the scrubber is one member selected from the group consisting of a structured column, a plate column and a spray column.

18. The process of claim 4, wherein the scrubber is the structured column.

19. The process of claim 11, wherein the temperature is in the range of 10° C.–30° C.

20. The process of claim 12, wherein the ratio is from 4 to 15.

* * * * *